US010833800B1

United States Patent
Wanierke

(10) Patent No.: US 10,833,800 B1
(45) Date of Patent: Nov. 10, 2020

(54) METHOD AND SYSTEM FOR CHANNEL DETECTION

(71) Applicant: Rohde & Schwarz GmbH & Co. KG, Munich (DE)

(72) Inventor: Otmar Wanierke, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/839,454

(22) Filed: Apr. 3, 2020

(51) Int. Cl.
*H04L 1/00* (2006.01)
*H04W 56/00* (2009.01)
*H04B 7/26* (2006.01)

(52) U.S. Cl.
CPC ......... *H04L 1/0036* (2013.01); *H04B 7/2678* (2013.01); *H04W 56/0075* (2013.01)

(58) Field of Classification Search
CPC . H04L 1/0036; H04B 7/2678; H04W 56/0075
See application file for complete search history.

(56) References Cited

U.S. PATENT DOCUMENTS

| | | | |
|---|---|---|---|
| 6,898,235 B1 * | 5/2005 | Carlin | H04B 1/001 342/147 |
| 2013/0273935 A1 * | 10/2013 | Amizur | G01S 3/74 455/456.1 |
| 2016/0306027 A1 * | 10/2016 | Chrabieh | H04L 27/2628 |

* cited by examiner

*Primary Examiner* — Vineeta S Panwalkar
(74) *Attorney, Agent, or Firm* — Christensen O'Connor Johnson Kindness PLLC

(57) ABSTRACT

A method and a system are provided for channel detection like radio frequency channel detection in modern telecommunication standards like 5G-NR (new radio). The method and the system provide a fast and sensitive channel detection by evaluating a radio frequency signal received. The respective method and system may be applied to different telecommunication standards, for example new telecommunication standards like 5G-NR (new radio) and LTE.

16 Claims, 2 Drawing Sheets

METHOD AND SYSTEM FOR CHANNEL DETECTION

FIELD OF THE DISCLOSURE

Embodiments of the present disclosure relate generally to a method of channel detection, for example in 5G-NR and LTE. Further, embodiments of the present disclosure relate generally to a system for channel detection, for example in 5G-NR and LTE.

BACKGROUND

In the state of the art, several methods and systems are known that are used to automatically detect a channel for radio frequency signals that are associated with telecommunication standards known for a long time.

The methods and systems are used to perform mobile coverage and/or Quality of Service (QoS) measurements in mobile networks. The respective measurement results can be used for network engineering, network optimization and/or troubleshooting.

However, the methods known in the state of the art are typically based on a 2-step approach according to which the channel power is measured first and measurements are performed by means of a telecommunication scanner with respect to a pre-defined frequency grid subsequently.

Modern telecommunication standards like 5G-NR (new radio) require a fast channel detection that cannot be achieved by the methods and systems known so far.

Furthermore, the methods and systems known are not sensitive enough in order to fulfil the respective requirements related to modern telecommunication standards like 5G-NR when it comes to channel detection.

SUMMARY

Accordingly, there is a need for a method and a system that enable detecting a radio frequency channel in modern telecommunication standards like 5G-NR (new radio).

The present disclosure provides a method of channel detection. In an embodiment, the method comprises the steps of:
receiving at least one radio frequency signal by at least one antenna, thereby generating a received signal, wherein the radio frequency signal comprises constant components that repeat over time by a repetition rate known;
applying several down-converters on sub-bands of the received signal, thereby generating down-converted signals;
converting the down-converted signals to digital data streams that comprise information concerning the respective down-converter used and the sampling time;
extracting at least a first vector and a second vector from the digital data streams for at least two different transmissions of each constant component at different times;
calculating scalar products for each constant component based on the respective first and second vectors;
adding the scalar products of the different constant components for all potential arrival times respectively, resulting in a complex set of values associated with the constant components; and
feeding the complex set of values associated with the constant components into a decider that delivers the most probable time value for the arrival time of the searched radio frequency signal.

Further, the disclosure provides a system for channel detection. In an embodiment, the system comprises at least one antenna and at least one receiver connected with the antenna and at least one evaluation circuit or module. The at least one antenna and the at least one receiver are configured to receive at least one radio frequency signal, thereby generating a received signal, wherein the radio frequency signal comprises constant components that repeat over time by a repetition rate known. The at least one evaluation circuit or module is configured to:
apply several down-converters on sub-bands of the received signal, thereby generating down-converted signals;
convert the down-converted signals into digital data streams that comprise information concerning the respective down-converter used and the sampling rate;
extract at least a first vector and a second vector from the digital data streams for at least two different transmissions of each constant component at different times;
calculate scalar products for each constant component based on the respective first and second vectors;
add the scalar products of the different constant components for all potential arrival times respectively, resulting in a complex set of values associated with the constant components; and
feed the complex set of values associated with the constant components into a decider that delivers the most probable time value for the arrival time of the searched radio frequency signal.

The method and the system according to embodiments of the present disclosure provide a fast and sensitive channel detection by evaluating a radio frequency signal received. In some embodiments, the respective method may be applied to different telecommunication standards, for example new telecommunication standards like 5G-NR (new radio) and LTE.

In some embodiments, a radio frequency transmitter transmits radio frequency signals that comprise constant components as well as variable components. The radio frequency transmitter transmits these signals at least twice, for example in a periodic manner.

It is known that the signals, for example the respective components, are transmitted within a certain time interval associated with the repetition rate known a priori. Moreover, a frequency distance used between the repetitive transmissions is also known a priori. The content of the constant components is not known exactly, but the content has to correspond to a limited number of known contents.

Concerning the variable components, it is only known that their content differs subsequently. In other words, the variable component of the signal does not relate to the same content in successive transmissions.

However, the real or true arrival time of the radio frequency signal is not known as well as the absolute frequency of the radio frequency signal since it is only known that the radio frequency signal is within a certain frequency band.

Nevertheless, the method and the system ensure that the arrival time of the radio frequency signal can be determined or estimated in an accurate manner. Furthermore, the absolute frequency of the radio frequency signal within the respective frequency band as well as the content of the constant components can be determined by the method and/or the system according to the present disclosure.

In general, the respective steps may be performed in an automatic manner by hardware, wherein the evaluation module is established by hardware, such as digital and/or analog circuits. Moreover, the respective steps may also be performed by software running on the evaluation module.

An aspect provides that the received signal is filtered by several filters, thereby generating the sub-bands of the received signal that are forwarded to the down-converters in order to generate the several down-converted signals for further processing. Hence, the several filters filter signals or signal portions that are not of interest for the respective analysis.

The several filters and the several down-converters may together establish a bank of filters/down-converters. This specific bank may also be called down-converter bank.

According to another aspect, a power value of the set of values associated with the constant components is determined, wherein the power value determined is fed into the decider. Thus, the decider obtains a single value for each possible arrival time that is used for deciding which of the respective potential arrival times the most probable one is.

Another aspect provides that the radio frequency signal is assigned to a frequency band, wherein the frequency band is divided in frequency ranges that are processed sequentially. Thus, the respective method may be performed in a stepwise manner, wherein in each of the steps the filters, for instance the band pass filters, are used for each signal component. A single filter may be used for several signal components provided that the signal components overlap with each other with regard to their frequency or that the frequency distance between subsequent transmissions of the radio frequency transmitter equals zero.

Generally, the filters and/or down-converters may only cover a certain portion/range of the entire frequency band associated with the radio frequency signal received. Since the down-converters/filters are applied on different frequency ranges of the frequency band in a subsequent manner, the entire frequency band is covered by the filters and/or down-converters.

Therefore, narrowband filters may be used which are less expensive compared to wideband filters.

Another aspect provides that the radio frequency signal also comprises variable components. The variable components of the radio frequency signal may also be taken into consideration during the evaluation for determining the respective arrival time of the radio frequency signal. The variable components may be evaluated in a similar manner.

Consequently, at least a first vector and a second vector may be extracted from the digital data streams for two different transmissions of each variable component at different times. Hence, the variable components and the constant components are processed independently from each other by different vectors or rather different digital data streams.

Accordingly, scalar products may be calculated for each variable component based on the respective first and second vectors. This step is done in a similar manner compared to the calculation of the scalar products associated with the constant components.

The scalar products of the different variable components may be added for all times, resulting in a complex set of values associated with the variable components. The complex set of values associated with the variable components may also be used for further processing.

Hence, the complex set of values associated with the variable components may also be fed into the decider such that the decider takes the complex set of values associated with the constant and variable components into account in order to determine the most probable arrival time of the radio frequency signal in an accurate manner.

Again, a power value of the set of values associated with the variable components may be determined, wherein the power value determined is fed into the decider. Thus, the decider receives the power value associated with variable components as well as the power value associated with the constant components in order to determine the most probable arrival time of the radio frequency signal.

In general, a metric may be generated that provides the probabilities for all potential arrival times to be the true arrival time. Put differently, the metric provides information concerning the respective probabilities for all potential arrival times under investigation, wherein the respective values of the metric define the respective probabilities that the corresponding potential arrival time is the true arrival time of the radio frequency signal.

Moreover, coarse frequency locations may be obtained, wherein the coarse frequency locations are further processed in order to obtain more accurate results. A brute force approach may be used for post-processing the coarse frequency locations. In this approach all possible contents in all frequency shifts still possible are verified with respect to an optimal match.

In some embodiments, a metric is generated that provides the probabilities for all potential arrival times to be the true arrival time, and wherein the coarse frequency locations are further processed while starting with the potential arrival times having high probabilities.

The repetition rate may be known from the telecommunication standard associated with the radio frequency signal. Thus, the radio frequency signal according to a certain telecommunication standard has a pre-defined repetition rate that is taken into consideration.

Generally, the constant and/or variable components are transmitted in a frame structure. The respective frame structure is taken into account by a time offset within the respective frame.

In some embodiments, the time of arrival of the frame is determined that corresponds to the time of arrival of the radio frequency signal.

Moreover, a display may be provided that is used to output results of the method, namely the time of arrival and the absolute frequency. An operator of the system is enabled to easily obtain the required information.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
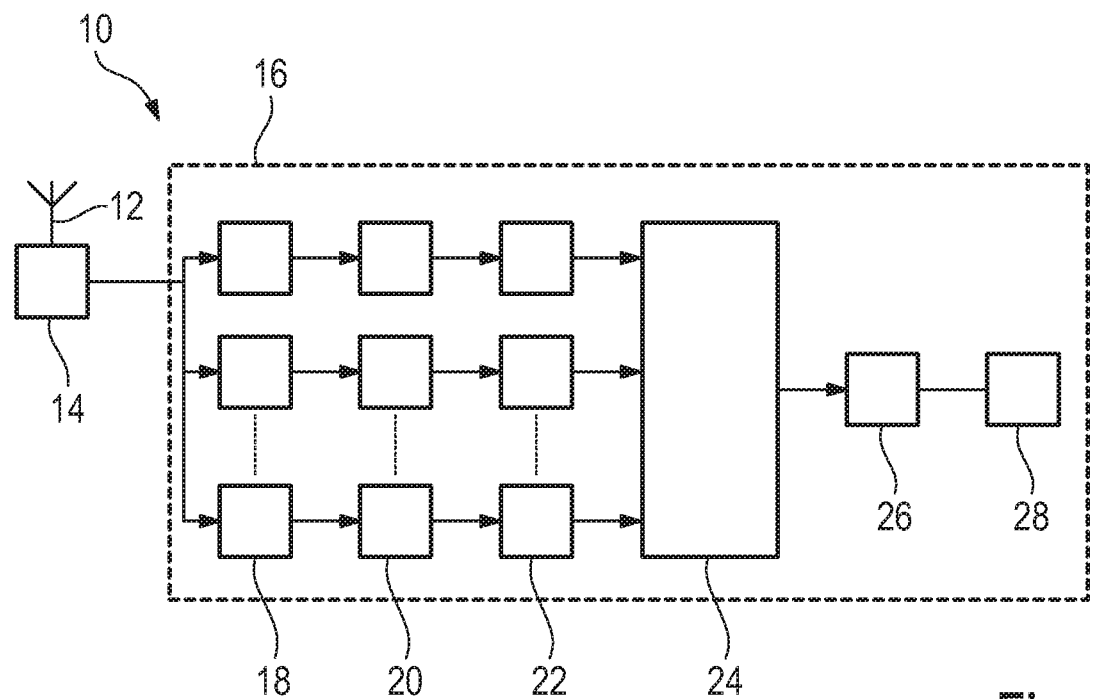
FIG. 1 schematically shows an overview of a system for channel detection according to an embodiment of the present disclosure.

FIG. 1 shows a system 10 for channel detection that comprises at least one antenna 12, at least one receiver 14 connected with the antenna 12, and at least one evaluation circuit or module 16 that is connected with the receiver 14. As shown in FIG. 1, the evaluation module 16 comprises several filters 18, several down-converters 20, several digitizers 22 as well as at least one calculation circuit or unit 24.

The system 10 shown in FIG. 1 is used to perform a method of channel detection that will be described in more detail while referring to FIGS. 2 and 3.

Figure 2:
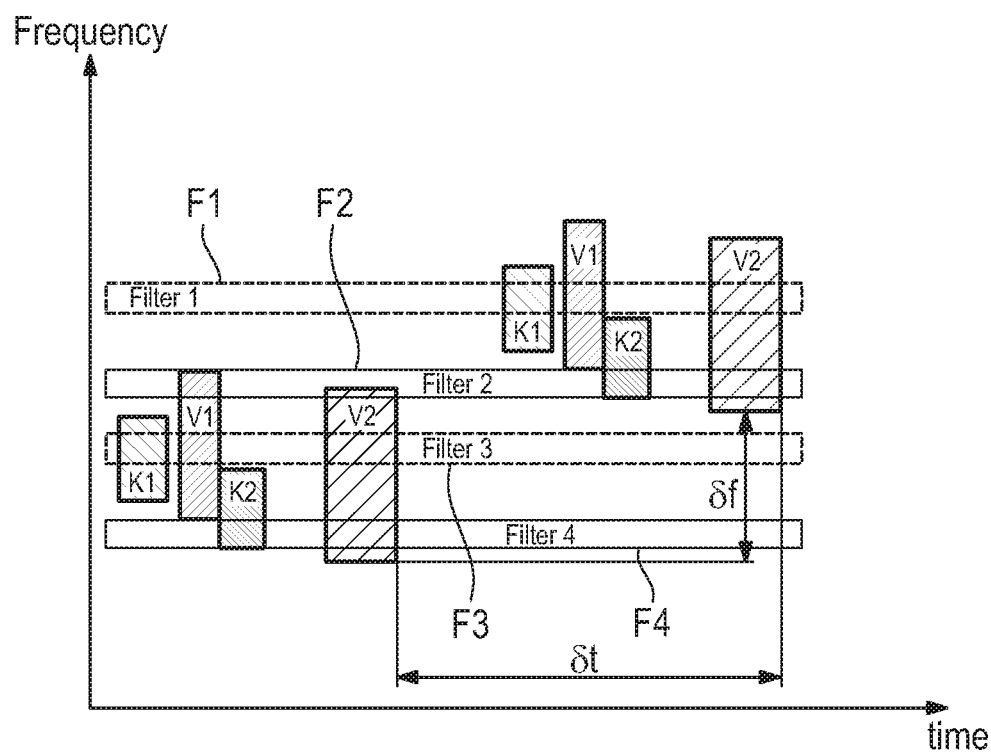
FIG. 2 schematically shows an overview illustrating a method of channel detection according to an embodiment of the present disclosure.

In FIG. 2, a radio frequency signal received encompassing two constant components K1, K2 as well as two variable components V1, V2 is shown that is transmitted twice by a radio frequency transmitter. FIG. 2 further reveals that both transmissions are distanced by a time interval δt, wherein the respective transmissions are also distanced by a frequency distance δf. These values are known as they relate to the telecommunication standard used by the radio frequency signal under investigation.

In addition, FIG. 2 shows that several filters (namely four filters F1-F4) are provided for generating sub-bands of the received signal as will be described later. The respective filters F1-F4 have a bandwidth that is equal for all filters F1-F4, wherein the respective bandwidth is smaller than the bandwidth of the respective components such that the range of the respective filters F1-F4 is filled completely by the components K1, K2, V1, V2.

Figure 3:
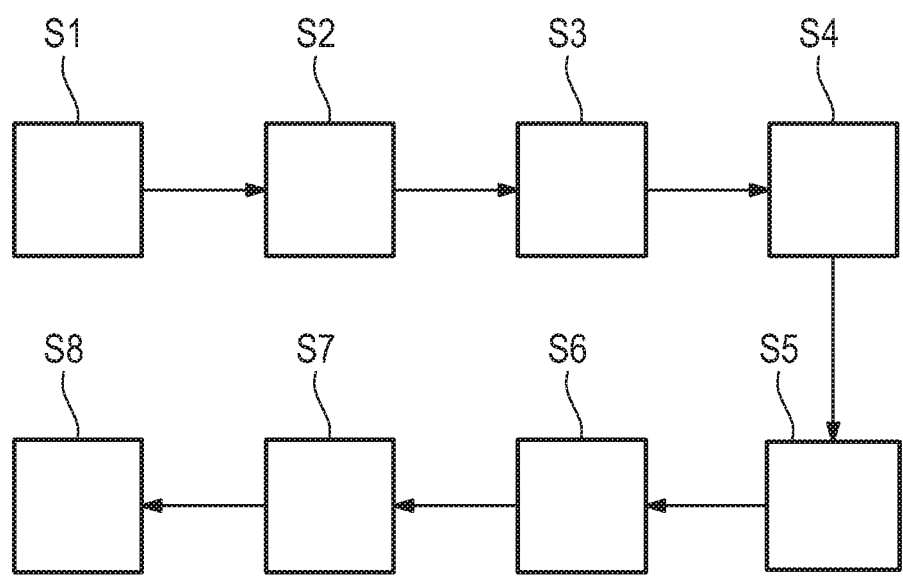
FIG. 3 shows a flow-chart illustrating the respective steps performed by a method of channel detection according to an embodiment of the present disclosure.

When referring to FIG. 3, the method of channel detection comprises a first step S1 in which the at least one radio frequency signal is received by the antenna 12 that generates a received signal. As mentioned above, the radio frequency signal comprises constant components K1, K2 as well as variable components V1, V2 that repeat over time by a repetition rate known that is associated with the time interval δt between two successive transmissions.

In a second step S2, the received signal is forwarded to the filters 18 that filter the received signal appropriately in order to generate the sub-bands of the received signal or rather filtered signals that are outputted. The filtered signals relate to different sub-bands of the received signal as illustrated in FIG. 2. The filtered signals or rather the sub-bands of the received signal are forwarded to the several down-converters 20 that down-convert the respective signals into a baseband for further processing. Accordingly, the filters 18 and the down-converters 20 together mix the respective sub-bands into the baseband for further processing.

In a fourth step S4, the down-converted signals are forwarded to the digitizers 22 that convert the down-converted signals to digital data streams. This is also called discretization. The digital data streams comprise information concerning the respective down-converter 20 used for obtaining the respective down-converted signal digitized later as well as the respective sampling time of the sampled value.

Thus, a sequence of complex numbers s(k,l) is provided for further processing, wherein k concerns the respective filter 18 and l corresponds to the respective sampling time. Alternatively, k may concern the respective down-converter 20 or rather the respective digitizer 22. In some embodiments, the filters 18, the down-converters 20 and the digitizers 22 may have an unambiguous relationship with each other. In some embodiments, the sampling rate of the digitizers 22 is chosen such that the known time interval δt consists of d sampling intervals.

In a fifth step S5, at least a first vector and a second vector are extracted from the digital data streams for at least two different transmissions of each constant component K1, K2, . . . , Kn at different times as well as for each variable component V1, V2, . . . , Vn at different times independently such that a respective vector comprises complex values with respect to different potential arrival times.

For instance, the first vector v1($m$) comprising the different s(k, l) can be described as follows, wherein m corresponds to the potential arrival times of the radio frequency signal:

$$v1(m)=\{s(3,e+m),s(3,e+m+1)+ \ldots +s(3,e+b-1)\},$$

wherein this vector concerns the first constant component K1 that was received by the third filter F3 (k=e) firstly. The respective potential times of arrival take the offset of the constant component K1 within the associated frame into account by the offset e. Furthermore, the vector has b values in total since the length of the first constant component corresponds to b sampling points.

In a similar manner, the second vector v2($m$), which relates to the second transmission of the same component, can be defined as follows:

$$v2(m)=\{s(3,e+d+m),s(3,e+d+m+1)+ \ldots +s(3,e+d+b-1)\},$$

wherein, in the second transmission (vector 2), the constant component K1 arrives later by a time interval δt that corresponds to d sampling points or rather sampling intervals as mentioned above.

The respective vectors can be defined for each constant component K1, K2, . . . Kn as well as for each variable component V1, V2, Vn respectively.

In a sixth step S6, scalar products for each constant component and/or each variable component are calculated based on the respective first and second vectors. The scalar products can be defined by $$a(K1,m)=\langle v1(m),v2(m)\rangle.$$

As mentioned above, similar scalar products can be determined for all components, resulting in a(K2, m), . . . a(Kn, m) as well as a(V1, m), . . . , a(Vn, m).

In a seventh step S7, the sequence of complex values obtained by the scalar products can be added for each respective potential arrival time m, resulting in the complex sequence of numbers c(m) for the constant components as well as the complex sequence of numbers v(m) for the variable components.

In an eighth step S8, a power value of the respective set of values is determined by determining the absolute square of the respective complex sequence of numbers, namely $|c(m)|^2$ and $|v(m)|^2$.

Thus, a metric may be determined based on the respective powers, wherein the metric provides the respective probabilities according to which the potential arrival time m is the real arrival time of the radio frequency signal.

Therefore, the complex set of values, for example the power values determined based thereon, are fed to a decider 26 that delivers the most probable time value for the arrival time of the radio frequency signal under investigation.

Hence, a determination of the arrival time of the radio frequency signal is provided without knowledge of the absolute frequency of the radio frequency signal as well as the content of the constant components.

Furthermore, the arrival time determined, the absolute frequency of the radio frequency signal as well as the content of the constant component(s) may be displayed on a display unit 28.

The arrival time of the radio frequency signal can be determined in a more accurate manner in a post-processing based on the respective probabilities for all potential arrival times. In some embodiments, a brute force approach or rather a symbol synchronization may be applied subsequently.

Accordingly, an improved synchronization of the arrival time as well as the absolute frequency may be performed once portions of the content of the constant components K1, K2, . . . , Kn have been detected.

Certain embodiments disclosed herein utilize circuitry (e.g., one or more circuits) in order to implement standards, protocols, methodologies or technologies disclosed herein, operably couple two or more components, generate information, process information, analyze information, evaluate information, calculate information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of channel detection, comprising:
    receiving at least one radio frequency signal by means of at least one antenna, thereby generating a received signal, wherein the radio frequency signal comprises constant components that repeat over time by a known repetition rate;
    applying several down-converters on sub-bands of the received signal, thereby generating down-converted signals;
    converting the down-converted signals to digital data streams that comprise information concerning the respective down-converter used and the sampling time;
    extracting at least a first vector and a second vector from the digital data streams for at least two different transmissions of each constant component at different times;
    calculating scalar products for each constant component based on the respective first and second vectors;
    adding the scalar products of the different constant components for all potential arrival times respectively, resulting in a complex set of values associated with the constant components; and
    feeding the complex set of values associated with the constant components into a decider that delivers the most probable time value for the arrival time of the searched radio frequency signal.

2. The method according to claim 1, wherein the received signal is filtered by several filters, thereby generating the sub-bands of the received signal.

3. The method according to claim 2, wherein the several filters and the several down-converters together establish a bank of filters/down-converters.

4. The method according to claim 1, wherein a power value of the set of values associated with the constant components is determined, and wherein the power value determined is fed into the decider.

5. The method according to claim 1, wherein the radio frequency signal is assigned to a frequency band, and wherein the frequency band is divided in frequency ranges that are processed sequentially.

6. The method according to claim 1, wherein the radio frequency signal also comprises variable components.

7. The method according to claim 6, wherein at least a first vector and a second vector are extracted from the digital data streams for two different transmissions of each variable component at different times.

8. The method according to claim 7, wherein scalar products are calculated for each variable component based on the respective first and second vectors.

9. The method according to claim 8, wherein the scalar products of the different variable components are added for all times, resulting in a complex set of values associated with the variable components.

10. The method according to claim 9, wherein the complex set of values associated with the variable components is also fed into the decider.

11. The method according to claim 10, wherein a power value of the set of values associated with the variable components is determined, and wherein the power value determined is fed into the decider.

12. The method according to claim 1, wherein a metric is generated that provides the probabilities for all potential arrival times to be the true arrival time.

13. The method according to claim 1, wherein coarse frequency locations are obtained, and wherein the coarse frequency locations are further processed.

14. The method according to claim 13, wherein a metric is generated that provides the probabilities for all potential arrival times to be the true arrival time, and wherein the coarse frequency locations are further processed while starting with the potential arrival times having high probabilities.

15. The method according to claim 1, wherein the repetition rate is known from the telecommunication standard associated with the radio frequency signal.

16. A system for channel detection, the system comprising:
- at least one antenna, at least one receiver connected with the antenna and at least one evaluation circuit,
- wherein the at least one antenna and the at least one receiver are configured to receive at least one radio frequency signal, thereby generating a received signal, wherein the radio frequency signal comprises constant components that repeat over time by a known repetition rate, and
- wherein the at least one evaluation circuit is configured to:
  - apply several down-converters on sub-bands of the received signal, thereby generating down-converted signals;
  - convert the down-converted signals to digital data streams that comprise information concerning the respective down-converter used and the sampling time used for said converting;
  - extract at least a first vector and a second vector from the digital data streams for at least two different transmissions of each constant component at different times;
  - calculate scalar products for each constant component based on the respective first and second vectors;
  - add the scalar products of the different constant components for all potential arrival times respectively, resulting in a complex set of values associated with the constant components; and
- feed the complex set of values associated with the constant components into a decider that delivers the most probable time value for the arrival time of the searched radio frequency signal.

* * * * *